(12) United States Patent
Chen et al.

(10) Patent No.: US 8,654,225 B2
(45) Date of Patent: Feb. 18, 2014

(54) COLOR INTERPOLATION SYSTEM AND METHOD THEREOF

(75) Inventors: Po-Chang Chen, Tainan (TW); Yuan-Chih Peng, Tainan (TW); Yu-Yu Sung, Tainan (TW)

(73) Assignee: Himax Imaging, Inc., Grand Cayman (KY)

( * ) Notice: Subject to any disclaimer, the term of this patent is extended or adjusted under 35 U.S.C. 154(b) by 351 days.

(21) Appl. No.: 13/149,690

(22) Filed: May 31, 2011

(65) Prior Publication Data

US 2012/0307115 A1    Dec. 6, 2012

(51) Int. Cl.
| | | |
|---|---|---|
| H04N 9/083 | (2006.01) | |
| H04N 3/14 | (2006.01) | |
| H04N 5/335 | (2011.01) | |
| H04N 9/04 | (2006.01) | |
| H04N 5/228 | (2006.01) | |
| H04N 9/64 | (2006.01) | |
| G06K 9/40 | (2006.01) | |

(52) U.S. Cl.
USPC ........ 348/280; 348/222.1; 348/242; 382/274; 382/275

(58) Field of Classification Search
USPC ............... 348/222.1, 273, 280, 241, 242; 382/274, 275
See application file for complete search history.

(56) References Cited

U.S. PATENT DOCUMENTS

| | | | |
|---|---|---|---|
| 5,848,181 A * | 12/1998 | Ogata | 382/169 |
| 6,111,607 A * | 8/2000 | Kameyama | 348/256 |
| 6,900,836 B2 * | 5/2005 | Hamilton, Jr. | 348/241 |
| 7,551,795 B2 * | 6/2009 | Xu et al. | 382/264 |
| 8,259,202 B2 * | 9/2012 | Tsukioka | 348/273 |
| 8,351,733 B2 * | 1/2013 | Yamazaki | 382/266 |
| 2002/0047907 A1 * | 4/2002 | Chen et al. | 348/222 |
| 2006/0119896 A1 * | 6/2006 | Chen et al. | 358/3.26 |
| 2012/0092535 A1 * | 4/2012 | Masuno et al. | 348/278 |

* cited by examiner

*Primary Examiner* — Daniel M Pasiewicz
(74) *Attorney, Agent, or Firm* — Stout, Uxa, Buyan & Mullins, LLP

(57) ABSTRACT

A color interpolation system is disclosed. An enhancement unit receives raw signals from an image sensor, and then processes the raw signals to output an enhanced first signal. A first interpolation unit receives and processes a raw first signal and accordingly outputs an interpolated first signal. A gain generator generates an enhancement gain according to the enhanced first signal and the interpolated first signal.

10 Claims, 5 Drawing Sheets

COLOR INTERPOLATION SYSTEM AND METHOD THEREOF

BACKGROUND OF THE INVENTION

1. Field of the Invention

The present invention generally relates to digital image processing, and more particularly to a color interpolation system and method thereof.

2. Description of Related Art

As an image sensor is commonly equipped with a color filter array (CFA), for example arranged as Bayer pattern, Raw image data retrieved from the image sensor therefore need be subjected to demosaicing to reconstruct a full color image. The demosaicing is normally performed by interpolation technique.

Image enhancement is another digital image processing commonly used to enhance one or more image parameters such as contrast, sharpness, etc. The image enhancement may be performed according to the results of edge detection or gradient.

In a conventional imaging system, the raw image data retrieved from the image sensor are firstly subjected to interpolation operation, followed by image enhancement process. One disadvantage of the conventional imaging system is its inherent drawback that red data and blue data are sampled at a rate substantially lower than green data, such that the imaging system generates distorted image with low sharpness.

For the foregoing reasons, a need has arisen to propose a novel imaging system with improved quality.

SUMMARY OF THE INVENTION

In view of the foregoing, it is an object of the embodiment of the present invention to provide a color interpolation system and method that are capable of simultaneously performing interpolation and enhancement with improved sharpness.

According to one embodiment, the color interpolation system includes an enhancement unit, a first interpolation unit and a gain generator. The enhancement unit is coupled to receive a number of raw signals from an image sensor, wherein, the raw signals include at least a raw first signal and a raw second signal, and the enhancement unit processes the raw signals to output an enhanced first signal. The first interpolation unit is coupled to receive and process the raw first signal and accordingly output an interpolated first signal. The gain generator is configured to generate an enhancement gain according to the enhanced first signal and the interpolated first signal.

According to another embodiment, the color interpolation system includes an enhancement unit, a first interpolation unit, a blender and a gain generator. The enhancement unit is coupled to receive a number of raw signals from an image sensor, wherein, the raw signals include at least a raw first signal and a raw second signal, and the enhancement unit processes the raw signals to output an enhanced first signal. The first interpolation unit is coupled to receive and process the raw first signal and accordingly output a plurality of interpolated first signals. The blender is configured to give weighting to the enhanced first signal with respect to one of the interpolated first signals, thereby outputting a weighted enhanced first signal. The gain generator is configured to generate an enhancement gain according to the weighted enhanced first signal and the interpolated first signals except the interpolated first signal fed to the blender.

DETAILED DESCRIPTION OF THE INVENTION

FIG. 1 shows a block diagram illustrative of a color interpolation system 1A according to one embodiment of the present invention. Each block of the illustrated system 1A may be implemented by hardware, software or their combination.

In the embodiment, the system 1A is coupled to receive a raw green signal G_raw, a raw red signal R_raw and a raw blue signal B_raw, which are in a raw format and are outputted from an image sensor (not shown in the figure) equipped with a color filter array (CFA) having a pattern such as Bayer pattern. Other possible patterns may, for example, be RGB pattern or CMY pattern. The color filter array of Bayer pattern may have plural of color filters, 50% of which are green, 25% of which are red and 25% of which are blue. Generally speaking, there are more green elements than red elements or blue elements in the Bayer pattern or other similar pattern. In this specification, the green signal, the red signal and the blue signal may be interchangeably named the first signal, the second signal and the third signal respectively.

Figure 1A:
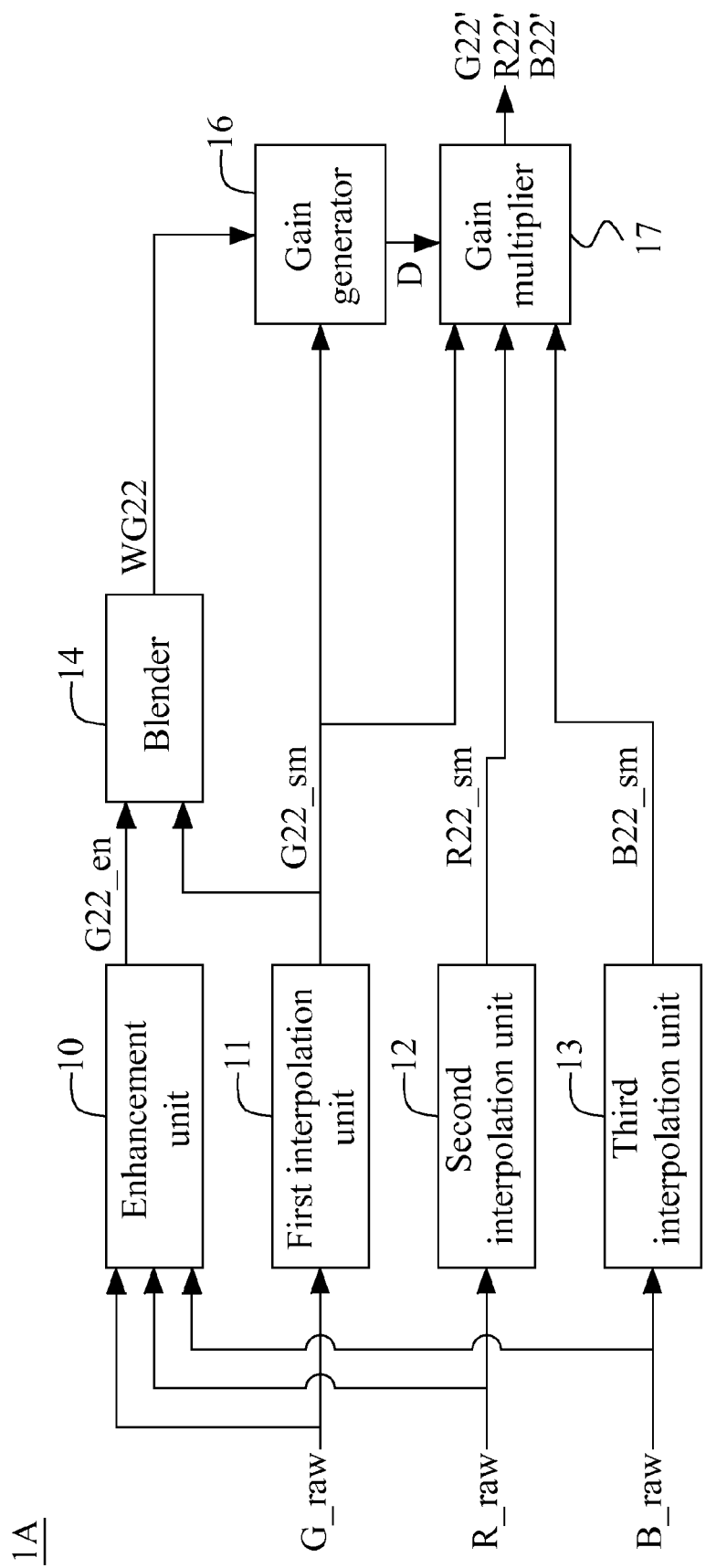
FIG. 1A shows a block diagram illustrative of a color interpolation system according to one embodiment of the present invention.
Figure 2:
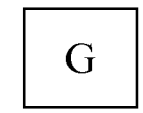
FIG. 2 shows a process window of image pixels with the raw blue signal at its center.
Figure 2:
Figure 2:
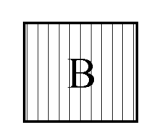

FIG. 2 shows a process window of image pixels (with the raw blue signal B_raw at its center), which constitute a portion of the image sensor. An enhancement unit 10 (FIG. 1A) is coupled to receive and process the raw signals G_raw, R_raw and B_raw, thereby outputting an enhanced green signal G22_en, which is located, at the center of the process window. The enhancement of the enhancement unit 10 may be performed by an enhancing mask, which may generally be a high-boost filter, as follows:

$$G22\_en = W01*P01 + W03*P03 + W10*P10 + W12*P12 + W14*P14 + W21*P21 + W23*P23 + W30*P30 + W32*P32 + W34*P34 + W41*P41 + W43*P43;$$

//W01-W43: Enhancing Mask Coefficient.

A first interpolation unit 11 receives and processes the raw green signal G_raw, and then outputs an interpolated green signal G22_sm at the center of the process window. A conventional interpolation technique, such as bi-linear interpolation, bi-cubic interpolation, spline interpolation, or the like, may be adopted by the first interpolation unit 11.

Similarly, a second interpolation unit 12 receives and processes the raw red signal R_raw, and then outputs an interpolated red signal R22_sm at the center of the process window. A conventional interpolation technique, such as bi-linear interpolation, bi-cubic interpolation, spline interpolation, or the like, may be adopted by the second interpolation unit 12.

Similarly, a third interpolation unit 13 receives and processes the raw blue signal B_raw, and then outputs an interpolated blue signal B22_sm at the center of the process window. A conventional interpolation technique, such as bi-linear interpolation, bi-cubic interpolation, spline interpolation, or the like, may be adopted by the third interpolation unit 13.

In one embodiment, a blender 14 may be selectively used to generate a weighted enhanced green signal WG22 according to the enhanced green signal G22_en and the interpolated, green signal G22_sm. Specifically, the blender 14 is used to give weighting to the enhanced green signal G22_en with respect to the interpolated green signal G22_sm. The weighted enhanced green signal WG22 may be obtained, for example, according to the following expression:

$$WG22=(G22\_en*\text{weight}+G22\_sm*(1-\text{weight}));$$

//weight: Weight of enhancing mask, not greater than 1 and not less than 0.

The expressions demonstrated above are with respect to the process window with the raw blue signal B_raw at its center. Similar expressions may be likewise obtained with respect to a process window with the raw red signal R_raw at its center.

Figure 3:
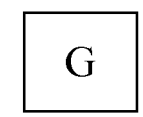
FIG. 3 shows another process window of image pixels with the raw green signal at its center, which has raw blue signals to its right and left.
Figure 3:
Figure 3:
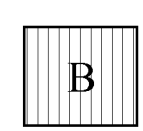

FIG. 3 shows another process window of image pixels with the raw green signal G_raw at its center, which has raw blue signals B_raw to its right and left.

Regarding this process window, the associated enhanced green signal G22_en and the weighted enhanced green signal WG22 may be respectively expressed as follows:

$$G22\_en=W00*P00+W02*P02+W04*P04+$$
$$W11*P11+W13*P13+W20*P20+W22*P22+$$
$$W24*P24+W31*P31+W33*P33+W40*P40+$$
$$W42*P42+W44*P44;$$

//W00-W44: Enhancing Mask Coefficient $$WG22=(G22\_en*\text{weight}+G22\_sm*(1-\text{weight}));$$

//weight: Weight of Enhancement Mask, not greater than 1 and not less than 0.

The expressions demonstrated above are with respect to the process window with the raw green signal G_raw at its center, which has raw blue signals B_raw to its right and left. Similar expressions may be likewise obtained with respect to a process window with the raw green signal G_raw at its center, which has raw red signals R_raw to its right and left.

The enhanced green signal G22_en (or the weighted enhanced green signal WG22 if the blender 14 is used) and the interpolated green signal G22_sm are fed to a gain generator 16 generates an enhancement gain D according to the enhanced green signal G22_en (or the weighted enhanced green signal WG22) and the interpolated green signal G22_sm. In one example, the enhancement gain D is generated according to a difference between the weighted enhanced green signal WG22 and the interpolated green signal G22_sm. In another example, the enhancement gain D is generated according to a ratio between the weighted enhanced green signal WG22 and the interpolated green signal G22_sm.

In one embodiment, if the absolute value of the difference between the weighted enhanced green signal WG22 and the interpolated green signal G22_sm is not greater than a predetermined noise threshold, the enhancement gain D has a value of "1." Otherwise, the enhancement gain D is determined according to the value of the difference between the weighted enhanced green signal WG22 and the interpolated green signal G22_sm and may be adjusted by a predetermined value.

Finally, a gain multiplier 17 is configured to multiply the interpolated, green signal G22_sm, the interpolated red signal R22_sm and the interpolated blue signal B22_sm with the enhancement gain D respectively as follow:

$$G22'=G22\_sm*D;$$

$$R22'=R22\_sm*D;$$

$$B22'=B22\_sm*D.$$

Figure 1B:
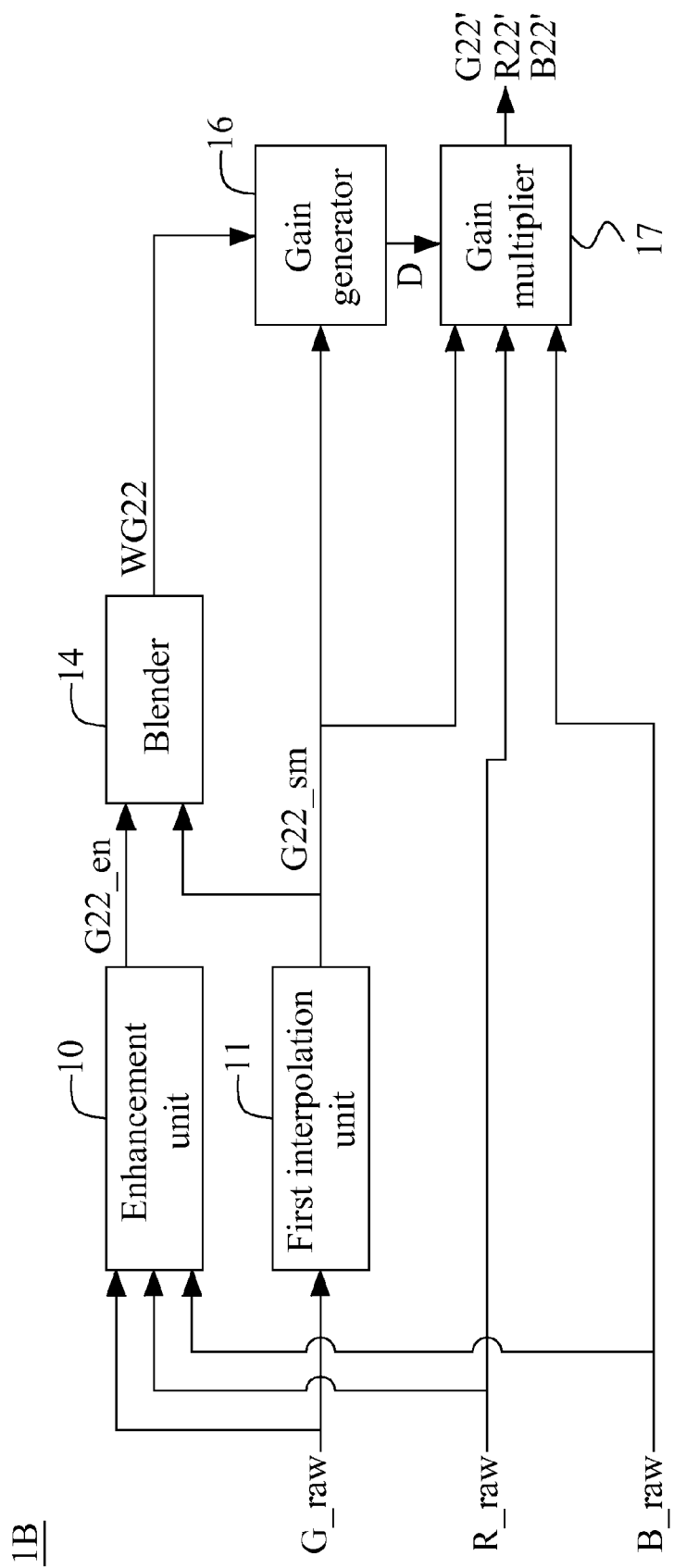
FIG. 1B shows a block diagram illustrative of a color interpolation system according to an embodiment alternative to FIG. 1A.

FIG. 1B shows a block diagram illustrative of a color interpolation system 1B according to an embodiment alternative to FIG. 1A. The system 1B of FIG. 1B is similar to the system 1A of FIG. 1A with the distinctness being described below. In the present embodiment, only the raw green signal G_raw is processed by an interpolation unit (i.e., the first interpolation unit 11). The gain multiplier 17 is configured to multiply the interpolated green signal G22_sm, the raw red signal R_raw and the raw blue signal B_raw with the enhancement gain D respectively.

Figure 4A:
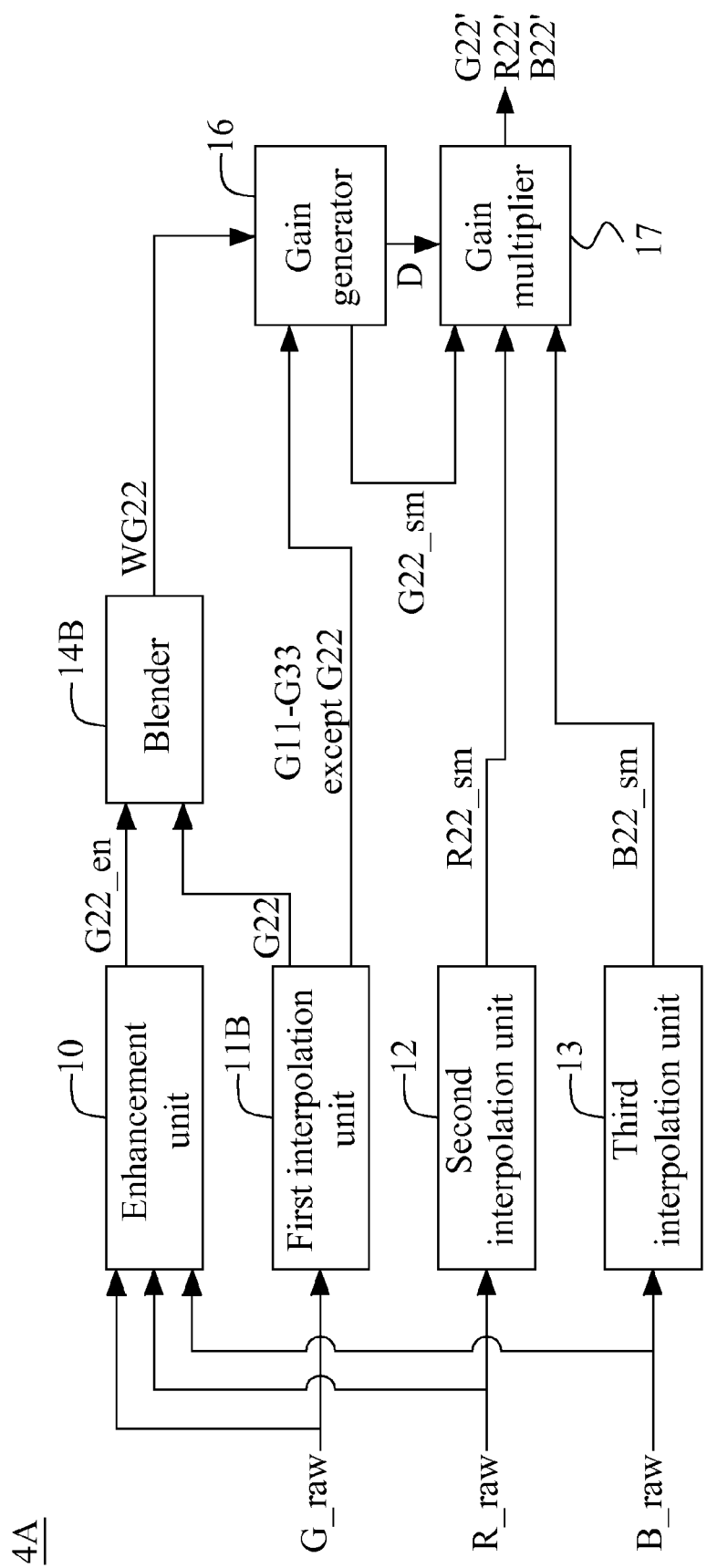
FIG. 4A shows a block diagram illustrative of a color interpolation system according to another embodiment of the present invention.

FIG. 4A shows a block diagram illustrative of a color interpolation system 4A according to another embodiment of the present invention. Each block of the illustrated system 4A may be implemented by hardware, software or their combination.

The system 4A of FIG. 4A is similar to the system 1A of FIG. 1A with the distinctness being described below. In the present embodiment, a first interpolation unit 11B receives and processes the raw green signal G_raw, and then outputs interpolated green signals G11-G33 (e.g., 3×3 pixels) that constitute a process sub-window (i.e., a subset of the original process window) centered at the process window as shown in FIG. 2. For example, the interpolated green signals G11-G33 may be obtained as follows:

$$G11=f(P01,P10,P21,P12);$$

$$G12=f(P01,P03,P21,P23,P12);$$

$$G13=f(P03,P12,P14,P23);$$

$$G21=f(P10,P12,P30,P32,P21);$$

$$G22=f(P12,P21,P23,P32);$$

$$G23=f(P14,P12,P34,P32,P23);$$

$$G31=f(P21,P30,P41,P32);$$

$$G32=f(P21,P23,P41,P43,P32);$$

$$G33=f(P23,P32,P34,P43);$$

G22=G22; //Output Green pixel.

A blender 14B is used to give weighting to the enhanced green signal G22_en with respect to the center interpolated green signal G22 (from the first interpolation unit 11B). The weighted enhanced green signal WG22 may be obtained, for example, according to the following expression:

$$WG22=(G22\_en*\text{alpha}+G22*(1-\text{alpha}));$$

//0=<alpha<1.

In the embodiment, the gain generator 16 may perform low-pass filtering (LPF) on the weighted enhanced green signal WG22 and the interpolated green signals, for example G11-G33 except G22, thereby resulting in an interpolated green signal G22_sm.

Similar to the system 1A of FIG. 1A, the weighted enhanced green signal WG22 and the interpolated green signal G22 are fed to the gain generator 16, which generates an enhancement gain D according to a difference or a ration between the weighted enhanced green signal WG22 and the interpolated green signal G22. The gain multiplier 17 is configured to multiply the interpolated green signal G22_sm, the interpolated red signal R22_sm and the interpolated blue signal B22_sm with the enhancement gain D respectively.

The expressions demonstrated above are with respect to the process window with the raw blue signal B_raw at its center (FIG. 2). Similar expressions may be likewise obtained with respect to a process window with the raw red signal R_raw at its center.

Figure 4B:
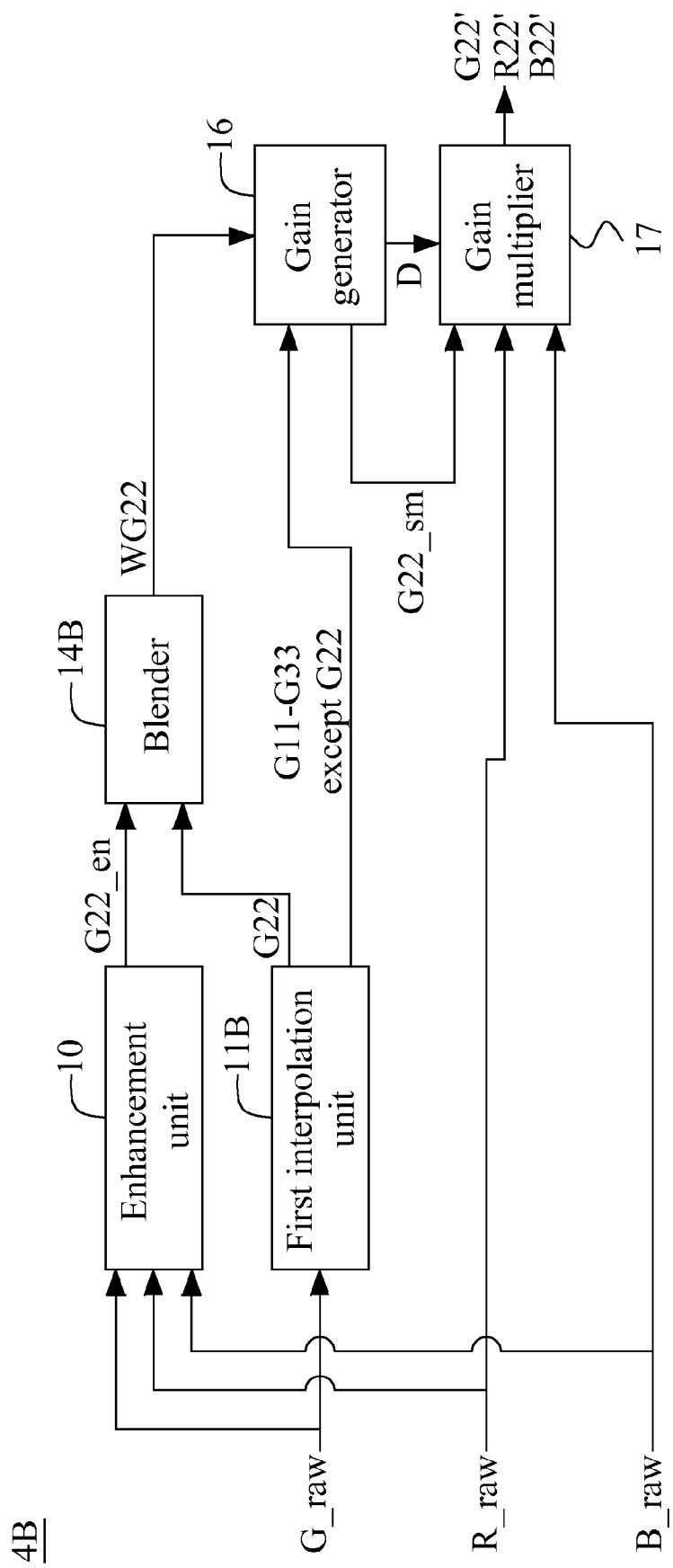
FIG. 4B shows a block diagram illustrative of a color interpolation system according to an embodiment alternative to FIG. 4A.

FIG. 4B shows a block diagram illustrative of a color interpolation system 4B according to an embodiment alternative to FIG. 4A. The system 4B of FIG. 4B is similar to the system 4A of FIG. 4A with the distinctness being described below. In the present embodiment, only the raw green signal G_raw is processed by an interpolation unit (i.e., the first interpolation unit 11B). The gain multiplier 17 is configured to multiply the interpolated green signal G22_sm, the raw red signal R_raw and the raw blue signal B_raw with the enhancement gain D respectively.

Although specific embodiments have been illustrated and described, it will be appreciated by those skilled in the art that various modifications may be made without departing from the scope of the present invention, which is intended to be limited solely by the appended claims.

What is claimed is:

1. A color interpolation system, comprising:
an enhancement unit coupled to receive a plurality of raw signals from an image sensor, wherein the plurality of raw signals include at least a raw first signal and a raw second signal, and the enhancement unit processes the raw signals to output an enhanced first signal;
a first interpolation unit coupled to receive and process the raw first signal and accordingly output an interpolated first signal;
a gain generator configured to generate an enhancement gain according to the enhanced first signal and the interpolated first signal; and
a gain multiplier configured to multiply the interpolated first signal and the raw second signal respectively with the enhancement gain.

2. The system of claim 1, further comprising a second interpolation unit coupled to receive and process the raw second signal and accordingly output an interpolated second signal.

3. The system of claim 2, wherein the gain multiplier is configured to multiply the interpolated first signal and the interpolated second signal respectively with the enhancement gain.

4. The system of claim 1, wherein the enhancement unit comprises an enhancing mask that acts as a high-boost filter.

5. The system of claim 1, wherein the enhancement unit and the first interpolation unit perform on a process window consisted of a plurality of image pixels of the image sensor.

6. The system of claim 5, wherein the process window of image pixels is configured as a Bayer pattern.

7. The system of claim 1, further comprising a blender disposed between the enhancement unit and the gain generator, the blender being configured to give weighting to the enhanced first signal with respect to the interpolated first signal.

8. A color interpolation method, comprising:
receiving a plurality of raw signals from an image sensor, wherein the plurality of raw signals include at least a raw first signal and a raw second signal, which are processed to output an enhanced first signal;
processing the raw first signal to output an interpolated first signal;
generating an enhancement gain according to the enhanced first signal and the interpolated first signal; and
multiplying the interpolated first signal and the raw second signal respectively with the enhancement gain.

9. The method of claim 8, further comprising a step of processing the raw second signal to output an interpolated second signal.

10. The method of claim 9, further comprising a step of multiplying the interpolated first signal and the interpolated second signal respectively with the enhancement gain.

\* \* \* \* \*